(12) United States Patent
Andou et al.

(10) Patent No.: US 7,157,544 B2
(45) Date of Patent: Jan. 2, 2007

(54) PROCESS FOR PRODUCING POLYCARBONATE OLIGOMER AND PROCESS FOR PRODUCING POLYCARBONATE RESIN USING THE SAME

(75) Inventors: Kazuhiro Andou, Ibaraki (JP); Kazuaki Shiomi, Ibaraki (JP); Toshiaki Aso, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 256 days.

(21) Appl. No.: 10/481,054

(22) PCT Filed: Jul. 9, 2002

(86) PCT No.: PCT/JP02/06927

§ 371 (c)(1),
(2), (4) Date: Dec. 17, 2003

(87) PCT Pub. No.: WO03/006527

PCT Pub. Date: Jan. 23, 2003

(65) Prior Publication Data

US 2004/0162439 A1    Aug. 19, 2004

(30) Foreign Application Priority Data

Jul. 11, 2001 (JP) .............................. 2001-210762
Feb. 15, 2002 (JP) .............................. 2002-038431

(51) Int. Cl.
*C08G 64/00* (2006.01)
(52) U.S. Cl. ................... 528/196; 264/176.1; 264/219; 422/131; 528/198
(58) Field of Classification Search ............. 264/176.1, 264/219; 422/131; 528/196, 198
See application file for complete search history.

(56) References Cited

U.S. PATENT DOCUMENTS 3,646,102 A    2/1972    Kobayashi et al.
4,153,780 A    5/1979    Narita et al.

FOREIGN PATENT DOCUMENTS

| JP | 46-21460 | 6/1971 |
| JP | 54-40280 | 12/1979 |
| JP | 55-52321 | 4/1980 |
| JP | 58-108225 | 6/1983 |
| JP | 8-217871 | 8/1996 |

*Primary Examiner*—Terressa Boykin
(74) *Attorney, Agent, or Firm*—Sughrue Mion, PLLC

(57) ABSTRACT

A process for producing an aromatic polycarbonate oligomer according to an interfacial polymerization method comprising reacting an aqueous solution of a bisphenol compound and phosgene in the presence of an organic solvent in a reactor, removing reaction heat by cooling, utilizing vaporization latent heat of the organic solvent to be used, cooling vaporized organic solvent through a condenser and returning an exhaust gas from the condenser to the reactor and a process for producing an aromatic polycarbonate resin used the same.

20 Claims, No Drawings

PROCESS FOR PRODUCING POLYCARBONATE OLIGOMER AND PROCESS FOR PRODUCING POLYCARBONATE RESIN USING THE SAME

This is a National stage entry under 35 U.S.C.§ 371 of PCT Application No. PCT/JP02/06927 filed Jul. 9, 2002; the above noted application is hereby incorporated by reference.

FIELD OF ART

The present invention relates to a process for producing an aromatic polycarbonate oligomer and a process for producing an aromatic polycarbonate resin used the same, and more specifically, to a process for producing an aromatic polycarbonate oligomer which comprises cooling a reaction liquid utilizing vaporization latent heat of an organic solvent to remove vast reaction heat during reaction of a bisphenol compound and phosgene and a process for producing an aromatic polycarbonate resin used the same.

BACKGROUND OF ART

In the process for producing an aromatic polycarbonate resin according to an interfacial polymerization method, when gaseous phosgene was injected into a mixture of an alkali aqueous solution of bisphenol and methylene chloride with stirring, a low molecular weight polycarbonate with chloroformate group on its ends was initially produced in a solvent. However a large amount of cooling water was necessary to control the reaction temperature because the reaction of an alkali salt of bisphenol and phosgene was rapid and an exothermic reaction. Further, it was required to maintain the reaction temperature to a low temperature of around 20° C. from the viewpoints of decomposition of phosgene and color of an aromatic polycarbonate resin thus obtained.

Japanese Patent Publication No.46-21460 discloses a process for producing continuously a polycarbonate oligomer which comprises introducing an alkali aqueous solution of bisphenol and an organic solvent for polycarbonate oligomer into a tubular reactor to form a mixed phase flow and performing a parallel flow reaction with phosgene and temporarily removing reaction heat generated during the reaction by vaporization latent heat of said organic solvent. However, in this process, the reaction is a parallel flow reaction in a tubular reactor and no stirring is performed. Further, the tubular reactor is a double tube in which cooling water is passed through a jacket portion. The generated reaction heat is temporarily removed by vaporization latent heat of the organic solvent, but a majority of the reaction heat is removed by the cooling water of the jacket portion. Further, in this process, gas-liquid separation of the reaction product is necessary, so that both operation and apparatus become complicated.

Thus, Japanese Patent Kokai (Laid-open) No.58-108225 suggests a process for producing a polycarbonate oligomer which comprises reacting an alkali aqueous solution of a dioxy compound and phosgene in the presence of an organic solvent, wherein a cooling jacket is provided with a reaction tube to maintain the temperature range of the reaction to 2 to 20° C. In order to perform efficiently cooling, it is necessary to make the tube diameter small. However, in such case, there occurs a dilemma that it becomes difficult to perform smoothly the reaction of mist droplet and gas in the reaction tube. Further, also in this process, a cooling medium of 0° C. or below to maintain to a low temperature was required.

On the other hand, Japanese Patent Publication No.54-40280 suggests a process for removing reaction heat to be generated during reaction which comprises contacting initial reaction product with a large amount of reaction products maintained to a constant temperature. However, in this process, it was not only difficult to control initial stage of phosgenating reaction, but it was difficult to avoid decomposition of both phosgene and chloroformate.

Further, Japanese Patent Kokai (Laid-open) No.55-52321 suggests a process for absorbing effectively reaction heat which comprises cooling an alkali aqueous solution of bisphenol to 0° C. or below and reacting the cooled aqueous solution and phosgene. However, in this process, although the reaction temperature could be made low, the contact of methylene chloride to be often used as an organic solvent with the aqueous solution in such a low temperature caused formation of a hydrate. Thus, the reaction system became a sherbet state, so that various inconveniences occurred and it was practicality improper.

As a process for removing such reaction heat, Japanese Patent Kokai (Laid-open) No. 47-14297 suggests a process for producing continuously a high molecular linear polycarbonate which comprising again feeding cooled high molecular weight reaction mixture. In this process, gas-liquid separation of reaction product was necessary because phosgene diluted with another inert gas was charged. Further there was a problem that decomposition of both phosgene and chloroformate became even large because amine was present and the system readily became an emulsion state.

Hitherto, regarding removal of reaction heat to be generated during phosgenating reaction of an aromatic polycarbonate resin (polycarbonate oligomer production reaction), the reaction was performed at a temperature of around 20° C. from the problems of decomposition of phosgene, blowing-out of phosgene and vaporization of reaction solvent. Therefore, a process for passing a cooling medium through a jacket or an inner coil to remove reaction heat and a process for performing external circulation of a reaction liquid to cool through a heat exchanger have been applied. However, in such processes, duty of electrical energy was enormous because a cooling medium of 0° C. or below was necessary and thus a refrigerator for production of a cooling medium was required.

DISCLOSURE OF THE INVENTION

An object of the present invention is to solve the above-mentioned prior art problems and to provide a process for producing an aromatic polycarbonate oligomer in which both facility investment of a refrigerator to be used for cooling in the production of a polycarbonate resin and electrical energy are reduced and productivity is improved and a process for producing an aromatic polycarbonate resin used the same.

As a result of extensive studies of a process to utilize vaporization latent heat of an organic solvent in order to remove reaction heat in the production of an aromatic polycarbonate oligomer, the inventors have found below. When methylene chloride is used as an organic solvent, the reaction temperature becomes around 40° C. Therefore, cooling water of about 20° C. cooled in a cooling tower can be used as a cooling medium. However, in order to condense perfectly the organic solvent, a very large scale condenser is required. Therefore, if an exhaust gas to be exhausted from the condenser is returned to the reactor, the organic solvent and phosgene to exhausted from the reactor through an exhaust pipe can be recovered without enlarging so much the condenser. Thus, the inventors have accomplished the present invention.

That is, in the present invention, the reaction is performed in a closed system until the completion of injection of phosgene and the reaction liquid is cooled to a temperature lower by 5° C. or above than a boiling point of an organic solvent and then an alkali aqueous solution and a polycondensation catalyst is added thereto to perform polycondensation until attainment of intended molecular weight.

The present invention has a feature that a check valve and/or a gas circulating pump is (are) provided with a returning pipe of an exhaust gas in order to prevent entrance of phosgene into the reactor through the condenser via the returning pipe of exhaust gas. Further, in the present invention, it has been found that decomposition of phosgene due to alkali can be depressed by controlling pH of an aqueous phase so as to be maintained to 10 to 12 during injection of phosgene.

That is, the present invention provides a process for producing an aromatic polycarbonate oligomer which comprises:

(a) charging an alkali aqueous solution of a bisphenol compound and a liquid organic solvent to a vessel shape reactor, equipped with a phosgene gas injection nozzle, a reflux condenser for organic solvent, a pipe positioned on an upper portion of said reflux condenser for returning an exhaust gas to said reactor, a stirrer and a cooling jacket (b) then, forming a liquid mixture with stirring (c) then, injecting phosgene into said liquid mixture through said phosgene gas injection nozzle with stirring to react said bisphenol compound with phosgene, (d) removing reaction heat generated during the reaction by cooling, utilizing vaporization latent heat of said liquid organic solvent (e) condensing vaporized organic solvent with said reflux condenser to return to said reactor and returning an exhaust gas comprising non-condensed organic solvent vapor to said reactor via said pipe for returning to said reactor (f) thereby, obtaining a reaction liquid comprising an aromatic polycarbonate oligomer, and (g) passing water through said cooling jacket to cool said reaction liquid comprising an aromatic polycarbonate oligomer.

Further, the present invention provides a process for producing an aromatic polycarbonate resin which comprises:

adding further liquid organic solvent, an alkali aqueous solution, a molecular weight modifier and a polymerization catalyst to the reaction liquid comprising an aromatic polycarbonate oligomer obtained by the above-mentioned process for producing in the above-mentioned vessel shape reactor or another vessel shape reactor equipped with a reflux condenser for organic solvent, a stirrer and a cooling jacket, performing stirring to continue polycondesation reaction while passing water through both the reflux condenser for organic solvent and the cooling jacket, thereby, obtaining an aromatic polycarbonate resin according to an interfacial polymerization method.

The present invention will be described in detail below.

It is preferable that the bisphenol compound to be used in the present invention is 2,2-bis(4-hydroxyphenyl)propane (hereinafter, "bisphenol A"). Examples of other bisphenols include bis(4-hydroxyphenyl)methane, 1,1-bis(4-hydroxyphenyl)ethane, 2,2-bis(4-hydroxyphenyl)butane, 2,2-bis(4-hydroxyphenyl)pentane, 2,2-bis(4-hydroxylphenyl)hexane, 2,2-bis(4-hydroxyphenyl)4-methylpentane, 1,1-bis(4-hydroxyphenyl) 1-phenylmethane, 1,1-bis(4-hydroxyphenyl) cyclohexane, 2,2-bis(4-hydroxy-3-methylphenyl)propane, 2,2-bis(4-hydroxyphenyl) hexa fluoropropane and 2,2-bis(3, 5-dibromo-4-hydroxyphenyl)propane.

Particularly, it is preferable that the raw material to be used in the present invention is a bisphenol compound with a melt Hasen color number of 50 or below after 4 hours from melting. For example, even if the reaction is performed at 30 to 50° C., an aromatic polycarbonate resin with a color equivalent to that of an aromatic polycarbonate resin produced at conventional reaction temperature can be obtained by using bisphenol A with a melt Hasen color number of 50 or below and preferably 30 or below.

The above-mentioned bisphenol compounds are dissolved in an alkali aqueous solution. As the alkali, alkali metal hydroxides such as sodium hydroxide and potassium hydroxide are preferably used. It is preferable that its concentration is 5 to 10% by weight in order to control pH in the alkali aqueous solution to 10 to 12.

In order to control pH of the aqueous phase so as to be maintained to 10 to 12 and preferably 10 to 11 during injection of phosgene, the molar ratio of bisphenol compound to alkali is preferably 1/1.9 to 1/3.2 and more preferably 1/2.0 to 1/2.5. In the preparation of these solutions, it is necessary to maintain the temperature to 20° C. or above. However, when it is too high, it is necessary not to raise the temperature higher than required because too high temperature causes occurrence of oxidation of the bisphenol compound. It is important to control the pH of aqueous phase to 10 to 12 in order to dissolve perfectly the bisphenol compound in an alkali aqueous solution. In order to prevent oxidation of the bisphenol compound, when the bisphenol compound is dissolved in an alkali aqueous solution in order to prevent oxidation of the bisphenol compound, it is preferable to perform under a nitrogen atmosphere or to add a small amount of reducing agent such as hydrosulfite.

It is important to maintain pH prior to injection of phosgene to 11 to 12 because the pH of the aqueous phase is controlled due to the production of sodium chloride and sodium carbonate during production reaction of an aromatic polycarbonate oligomer.

Further, regarding a gas phase portion of the reactor, the condenser for organic solvent, the check valve and the exhaust gas pipe, it is preferable to use materials with excellent corrosion resistance from the viewpoint of color of an aromatic polycarbonate resin to be obtained thus because probability to contact phosgene gas is very high.

Examples of materials with excellent corrosion resistance include stainless steels containing 11% by weight or more of Ni and 16% by weight or more of Cr, nickel alloys containing 50% by weight or more of Ni, titanium alloys, Teflon (trade mark), glasses and ceramics.

More detailed examples include at least one selected from SUS317, SUS317L, SUS309S, SUS310S, Monel alloy, inconel alloy, hastelloy alloy, chlromet alloy, titanium, titanium alloy, zirconium, zirconium alloy, Teflon (trade mark), glass and ceramic.

Further, as the organic solvent to be used, methylene chloride is preferable from the viewpoints from boiling point, vaporization latent heat and good solubility of an aromatic polycarbonate resin to be obtained. Methylene chloride is recovered to reuse. The content of carbon tetrachloride in methylene chloride is 50 ppm or below and preferably 20 ppm or below. 0.1 to 1 L of the organic solvent per 1 mol of bisphenol is used.

Phosgene is used in the range of usually 100 to 120 mol and preferably 105 to 115 mol per 100 mol of bisphenol A. The content of carbon tetrachloride in phosgene to be used in the present invention is preferably 100 ppm or below and more preferably 50 ppm or below from the viewpoint of color of an aromatic polycarbonate resin to be obtained. It is not preferable since carbon tetrachloride in phosgene is accumulated in methylene chloride as a solvent. The injection time of phosgene is usually 10 to 120 minutes and preferably 15 to 60 minutes. However, in the present invention, since vaporization latent heat of an organic solvent to be used for reaction heat is utilized, it is necessary to adjust an injection rate of phosgene depending on the capacity of a condenser for the organic solvent to be used. It is preferable that the reaction temperature is 30 to 50° C. considering the organic solvent to be used.

The object of the present invention is to reduce utility without exerting any influence on hydrolysis of phosgene and color of an aromatic polycarbonate resin to be used by utilizing vaporization latent heat for removal of reaction heat due to injection of phosgene. It is preferable that the reaction solvent to be used is dichloromethane. A condenser for condensation of the solvent is equipped with the reactor. The process for returning an exhaust gas to the reactor is applied because there is a possibility that dichloromethane as the solvent is contained in the exhaust gas in the condenser. That is, there is applied a process in which the reaction is performed in a closed system until the reaction mixture liquid is cooled to a temperature lower by 5° C. or above than a boiling point of the solvent. The exhaust gas is returned to reactor through a check value and/or a gas circulating pump, whereby an effect to prevent reversed flow of phosgene from a returning pipe is exhibited.

Further, it is a preferable embodiment to connect the returning pipe of the exhaust gas to a phosgene injection nozzle through a gas circulating pump.

Among a check valve for prevention of reversed flow of phosgene and or a gas circulating pump to be equipped with a pipe for returning an exhaust gas from an outlet of the condenser to the reactor, a check valve is preferable because its structure is simple and it is easy to maintain a pressure of the reactor system interior to a constant pressure. A fan type gas circulating pump also may be applied. When a gas circulating pump is used, it is preferable to equip a pressure sensor with both an inlet and an outlet of a gas circulating pump and to control a pressure difference between both so as to be maintained to 5 to 500 mmAq. However, it is possible also to use together with a check valve instead of controlling.

In the present invention, when a reaction mixture liquid has been cooled to a temperature lower by 5° C. or above than a boiling of used organic solvent after the completion of injection of phosgene, at the time, an alkali aqueous solution, a molecular weight modifier and a polymerization catalyst are added thereto to continue a polycondensation reaction and then a polycondensation reaction is performed until intended molecular weight is obtained.

Examples of the molecular weight modifier include monohydric phenols such as phenol, p-t-butyl phenol, 2,4,6-tribromophenol and long chain alkyl phenol, aliphatic carboxylic acid chloride, aliphatic carboxylic acid, hydroxyl alkyl benzoate and alkyl ether phenol and a combination of two species of compound thereof may be used. The amount of the molecular weight modifier to be added is 0.01 to 0.1 mol per 1 mol of charged dihydric phenol.

The molecular weight modifier may be fed in a molten stale or in a state dissolved in a solvent to be used for the reaction.

In the present invention, it is suitable that a brine for cooling the heat transfer area of a condenser (heat exchanger) to liquidize a solvent vaporized during the reaction has a heat capacity (temperature) necessary to absorb sufficiently heat energy. It is preferable that the temperature of the brine is in the range of from 5° C. to a temperature lower by 15° C. or above than a boiling point of a solvent. The higher temperature of the brine is not preferable because a heat transfer area of an heat exchanger becomes large, so that the installation of a large scale heat exchanger is required.

Further, a molecular weight modifier is added and then the polymerization is completed in the presence of a polymerization catalyst with stirring for 20 to 120 minutes. Examples of a polymerization catalyst for interfacial polymerization process to be used in the present invention include tertiary amines such as triethylamine, tetraammonium salts, tertiaryphosphine, tetraphosphonium salts, nitrogen-containing hetero cyclic compounds and salts thereof, imino ether and salts thereof and compounds with an amide group(s), among which tertiaryamine such as triethylamine is preferable. The amount of the polymerization catalyst to be added is 0.1 to 10 mmol per 1 mol of charged dihydric phenol.

The alkali aqueous solution to be added together with a molecular weight modifier is usually 0.2 to 1.0 mol and preferably 0.3 to 0.8 mol as alkali per 1 mol of charged dihydric phenol.

The viscosity average molecular weight (Mv) of the aromatic polycarbonate resin to be obtained in the present invention is 10,000 to 50,000 and preferably 13,000 to 40,000.

In the process for producing of the present invention, both a continuous process and a batch process are applied. A batch process is preferable.

When a batch process is applied to the polycarbonate resin of the present invention, a conventional reactor, equipped with a stirrer, a phosgene injection pipe, a condenser (heat exchanger) for organic solvent, pipe for returning an exhaust gas to the reactor through a check valve of upper portion of the condenser and a jacket is applied. The stirrer is not limited. Paddle type turbine blade stirrer, max blend type stirrer, full zone type stirrer and reciprocal reversible rotating type stirrer can be applied, among which reversible rotating type stirrer is preferable.

BEST MODE FOR CARRYING OUT THE INVENTION

The present invention will be described in more detail below, referring to Examples, which are not intended to limit the scope of the present invention.

The methods for measurement of each properties in Examples and Comparative Example are as follows.

[Measurement of Hold-up Melt Color of Bisphenol A]

A test tube enclosed 10 g of bisphenol A was set to an aluminum block bath maintained to 175° C. After 4 hours from melting, a numerical value of melt Hasen color was determined in comparison color with APHA standard color.

[Measurement of Viscosity Average Molecular Weight and Molecular Weight Distribution]

Viscosity average molecular weight (Mv) was measured using polystyrene as standard polymer with a GPC apparatus, manufactured by Waters Co., (column Ultrastairagel $10^5+10^4+10^3+500$ Å, manufactured by Waters Co.). Then, a relation between dissolution time and polycarbonate molecular weight was determined according a universal calibration method, whereby a calibration curve was made.

A dissolution curve of polycarbonate was measured under the same conditions as in the calibration curve. Each average molecular weight (viscosity average molecular weight) was determined from both dissolution time (molecular weight) and peak area of the dissolution time (proportion to molecule number).

Regarding molecular weight distribution, weight average molecular weight (Mw)/number average molecular weight (Mn) to be obtained by the above-mentioned analysis was determined by calculation.

[Measurement of Content of Low Molecular Weight Compounds]

A content of low molecular weight compounds was measured with a LC apparatus, manufactured by Waters Co., (column: K803×2, manufactured by Shodex Co.,). A content of compounds with low molecular weight of trimer or below to dissolution curve (peak area) of polycarbonate as a sample was determined from a proportion of a peak area of low molecular weight compounds (trimer or below) to dissolution curve (peak area) of polycarbonate as a sample obtained by the above-mentioned method.

[Measurement of Content of Cl Group On Resin Ends]

A content of chloroformate (Cl) group on resin ends was measured with a spectrophotometer according to a comparison color method used 4 -(4'-nitrobenzyl) pyridine.

[Measurement of Content of OH Group On Resin Ends]

A content of phenolic hydroxide (OH) group on resin ends was measured with a spectrophotometer by comparison color determination of reddish brown coloration produced by reaction with titanium tetrachloride

[Measurement of YI of Molded Article]

Regarding color, pelletization was performed with an extruder and then molding was performed with a molder of clamping force 50 ton, manufactured by Nihon Seikosho K. K., to prepare a molded article of thickness 3 mm and its YI was measured by a color difference meter.

[Measurement of Phosgene Decomposition Percentage]

Both sodium carbonate content and sodium chloride content in an aqueous phase completed polymerization were analyzed, whereby phosgene decomposition percentage was determined.

[Measurement of Weight Average Molecular Weight of Aromatic Polycarbonate Oligomer]

Measurement was performed using polystyrene as standard polymer with a GPC apparatus, manufactured by Waters Co., (column: Ultrastairagel $10^5+10^4+10^3+500$ Å, manufactured by Waters Co.). Then, a relation between dissolution time and polycarbonate molecular weight was determined according to a universal calibration method, whereby a calibration curve was made.

A dissolution curve of polycarbonate oligomer was measured under the same conditions as in the calibration curve and weight average molecular weight (Mw) was determined from both dissolution time (molecular weight) and peak area of dissolution time (proportion to molecule number) by calibration.

[Loss Percentage of Methylene Chloride]

A proportion of methylene chloride recovered from both a condenser cooled to −20° C. of exhaust gas line and adsorption column to methylene chloride used for the reaction.

EXAMPLE 1

950 L of 8.8% (w/v) sodium hydroxide, 210 kg of 2,2-bis(4-hydroxyphenyl) propane of melt Hasen color number 45 after 4 hours from melting and 600 g of hydrosulfite were added to a glass lining reactor of 3,000 L, equipped with a stirrer, a phosgene gas injection nozzle, a condenser for organic solvent (hastelloy C heat exchanger), a pipe for returning an exhaust gas to the reactor through a check valve at the upper portion of the condenser and a jacket and stirring was performed. At this time, pH of a mixture thus obtained was 11.0. 300 L of methylene chloride was added thereto and 99 kg of phosgene was injected therein over 30 minutes with stirring. After 6 minutes from the completion of injection of phosgene, when the temperature of the reaction mixture liquid reached to 30° C., the closed system was opened and 100 ml of the reaction liquid was sampled. The measurement results of weight average molecular weight of polycarbonate oligomer in the reaction liquid and content of low molecular weight compounds and phosgene decomposition percentage, pressure inside the reactor and quantity of electricity for cooling necessary to produce 1 kg of polycarbonate oligomer were shown in Table 1. Further, pH of the aqueous phase of the reaction liquid was 10.5.

Then, 8.1 kg of p-t-butyl phenol, 30 L of methylene chloride and 200 L of 8.8% (w/v) sodium hydroxide were added thereto with stirring and then stirring was continued for 6 minutes. Then, 270 L of methylene chloride and 1.29 mol of triethylamine were added thereto and the polymerization was performed with stirring for about one hour. Cooling water of 20° C. was passed through the condenser and the jacket in this reaction.

The polymerization liquid was separated into an aqueous phase and an organic phase. The organic phase was neutralized with phosphoric acid and water washing was repeated with pure water until an electrical conductivity of the washing liquid reached to 1 µm/S and then the organic phase was filtered through a precise filter. The purified resin liquid was added to warm water and wet pulverized with a disintegrater. Then, a solid matter was recovered and dried for 6 hours at 140° C. in a dryer.

The viscosity average molecular weight (Mv) and molecular weight distribution (Mw/Mn) of the aromatic polycarbonate resin were determined with a GPC analyzer. The content of low molecular weight compounds was determined by LC analysis. The content of Cl group on resin ends and the content of OH group on resin ends were determined according to a color comparison method. The results were shown in Table 2.

The powder obtained in the above-mentioned experiment was pelletized with an extruder at a resin temperature of 270° C. The pellets thus obtained was injection molded in 5 shots into a molded plate of thickness 3 mm at a resin temperature of 310° C. and a mold temperature of 110° C. with a molder and then its YI was measured by a color difference meter. The results were as shown in Table 2.

EXAMPLE 2

950 L of 8.8% (w/v) sodium hydroxide, 210 kg of 2,2-bis(4-hydroxyphenyl) propane of melt Hasen color number 30 after 4 hours from melting and 600 g of hydrosulfite were added to a glass lining reactor of 3,000 L, equipped with a stirrer, a phosgene gas injection nozzle, a condenser for organic solvent (hastelloy C heat exchanger), a pipe for returning an exhaust gas to the reactor through a check valve at the upper portion of the condenser and a jacket and stirring was performed. At this time, pH of a mixture thus obtained was 11.0. 300 L of methylene chloride was added thereto and 99 kg of phosgene was injected therein over 30 minutes with stirring. After 6 minutes from the completion of injection of phosgene, when the temperature of the reaction mixture liquid reached to 30° C., the closed system was opened and 100 ml of the reaction liquid was sampled. The measurement results of weight average molecular weight of polycarbonate oligomer in the reaction liquid and content of low molecular weight compounds and phosgene decomposition percentage, pressure inside the reactor and quantity of electricity for cooling necessary to produce 1 kg of polycarbonate oligomer were shown in Table 1. Further, pH of the aqueous phase of the reaction liquid was 10.6.

Then, 8.1 kg of p-t-butyl phenol, 30 L of methylene chloride and 200 L of 8.8% (w/v) sodium hydroxide were added thereto with stirring and then stirring was continued for 6 minutes. Then, 270 L of methylene chloride and 1.29 mol of triethylamine were added thereto and the polymerization was performed with stirring for about one hour. Cooling water of 20° C. was passed through the condenser and the jacket in this reaction. The following treatment, analysis and evaluation method were performed in the same manner as in Example 1. The results were shown in Table 2.

EXAMPLE 3

950 L of 8.8% (w/v) sodium hydroxide, 210 kg of 2,2-bis(4-hydroxyphenyl) propane of melt Hasen color number 30 after 4 hours from melting and 600 g of hydrosulfite were added to a glass lining reactor of 3,000 L, equipped with a stirrer, a phosgene gas injection nozzle, a condenser for organic solvent (hastelloy C heat exchanger), a pipe for returning an exhaust gas to the reactor through a blower pump (maximum pressure difference: 100 mmAq) at the upper portion of the condenser and a jacket and stirring was performed. At this time, pH of a mixture thus obtained was 11.0. 300 L of methylene chloride was added thereto and 99 kg of phosgene was injected therein over 30 minutes with stirring. After 6 minutes from the completion of injection of phosgene, when the temperature of the reaction mixture liquid reached to 30° C., the closed system was opened and 100 ml of the reaction liquid was sampled. The measurement results of weight average molecular weight of polycarbonate oligomer in the reaction liquid and content of low molecular weight compounds and phosgene decomposition percentage, pressure inside the reactor and quantity of electricity for cooling necessary to produce 1 kg of polycarbonate oligomer were shown in Table 1. Further, pH of the aqueous phase of the reaction liquid was 10.4.

Then, 8.1 kg of p-t-butyl phenol, 30 L of methylene chloride and 200 L of 8.8% (w/v) sodium hydroxide were added thereto with stirring and then stirring was continued for 6 minutes. Then, 270 L of methylene chloride and 1.29 mol of triethylamine were added thereto and the polymerization was performed with stirring for about one hour. Cooling water of 20° C. was passed through the condenser and the jacket in this reaction. The following treatment, analysis and evaluation method were performed in the same manner as in Example 1. The results were shown in Table 2.

EXAMPLE 4

950 L of 8.8% (w/v) sodium hydroxide, 210 kg of 2,2-bis(4-hydroxyphenyl) propane of melt Hasen color number 25 after 4 hours from melting and 600 g of hydrosulfite were added to a glass lining reactor of 3,000 L, equipped with a stirrer, a phosgene gas injection nozzle, a condenser for organic solvent (hastelloy C heat exchanger), a pipe for returning an exhaust gas to the reactor through a check valve at the upper portion of the condenser and a jacket and stirring was performed. At this time, pH of a mixture thus obtained was 11.0. 300 L of methylene chloride was added thereto and 99 kg of phosgene was injected therein over 30 minutes with stirring. After 6 minutes from the completion of injection of phosgene, when the temperature of the reaction mixture liquid reached to 30° C., the closed system was opened and 100 ml of the reaction liquid was sampled. The measurement results of weight average molecular weight of polycarbonate oligomer in the reaction liquid and content of low molecular weight compounds and phosgene decomposition percentage, pressure inside the reactor and quantity of electricity for cooling necessary to produce 1 kg of polycarbonate oligomer were shown in Table 1. Further, pH of the aqueous phase of the reaction liquid was 10.5.

Then, 8.1 kg of p-t-butyl phenol, 30 L of methylene chloride and 200 L of 8.8% (w/v) sodium hydroxide were added thereto with stirring and then stirring was continued for 6 minutes. Then, 270 L of methylene chloride and 1.29 mol of triethylamine were added thereto and the polymerization was performed with stirring for about one hour. Cooling water of 20° C. was passed through the condenser and the jacket in this reaction. The following treatment, analysis and evaluation method were performed in the same manner as in Example 1. The results were shown in Table 2.

COMPARATIVE EXAMPLE 1

The same experiment as in Example 1 was conducted except that the upper of the condenser was connected to an exhaust gas line during injection of phosgene and phosgenating reaction was performed in an open system. pH of the mixture at the charge was 11.0 and pH of an aqueous phase of the reaction liquid after the completion of injection of phosgene was 10.7. The results were shown in Tables 1 and 2.

COMPARATIVE EXAMPLE 2

950 L of 8.8% (w/v) sodium hydroxide, 210 kg of 2,2-bis(4-hydroxyphenyl) propane of melt Hasen color number 70 after 4 hours from melting and 600 g of hydrosulfite were added to a glass lining reactor of 3,000 L, equipped with a stirrer, a gas injection nozzle, and a jacket and stirring was performed. At this time, pH of a mixture thus obtained was 11.0. 300 L of methylene chloride was added thereto and 99 kg of phosgene was injected therein over 30 minutes with stirring while maintaining the solution temperature to 20° C. After 6 minutes from the completion of injection of phosgene, the closed system was opened and 100 ml of the reaction liquid was sampled. The measurement results of weight average molecular weight of polycarbonate oligomer in the reaction liquid and content of low molecular weight compounds and phosgene decomposition percentage, pressure inside the reactor and quantity of electricity for cooling necessary to produce 1 kg of polycarbonate oligomer were shown in Table 1. Further, pH of the aqueous phase of the reaction liquid was 10.6.

Then, 8.1 kg of p-t-butyl phenol, 30 L of methylene chloride and 200 L of 8.8% (w/v) sodium hydroxide were added thereto with stirring and then stirring was continued for 6 minutes at a reaction mixture liquid temperature of 20 to 24° C. Then, 270 L of methylene chloride and 1.29 mol of triethylamine were added thereto and the polymerization was performed with stirring for about one hour. The temperature of a cooling medium passed through the jacket in this reaction was −25° C. The following treatment, analysis and evaluation method were performed in the same manner as in Example 1. The results were shown in Table 2.

COMPARATIVE EXAMPLE 3

950 L of 8.8% (w/v) sodium hydroxide, 210 kg of 2,2-bis(4-hydroxyphenyl) propane of melt Hasen color number 30 after 4 hours from melting and 600 g of hydrosulfite were added to a glass lining reactor of 3,000 L, equipped with a stirrer, a gas injection nozzle, and a jacket and stirring was performed. At this time, pH of a mixture thus obtained was 11.0. 300 L of methylene chloride was added thereto and 99 kg of phosgene was injected therein over 30 minutes with stirring while maintaining the solution temperature to 20° C. After 6 minutes from the completion of injection of phosgene, the closed system was opened and 100 ml of the reaction liquid was sampled. The measurement results of weight average molecular weight of polycarbonate oligomer in the reaction liquid and content of low molecular weight compounds and phosgene decomposition percentage, pressure inside the reactor and quantity of electricity for cooling necessary to produce 1 kg of polycarbonate oligomer were shown in Table 1. Further, pH of the aqueous phase of the reaction liquid was 10.5.

Then, 8.1 kg of p-t-butyl phenol, 30 L of methylene chloride and 200 L of 8.8% (w/v) sodium hydroxide were added thereto with stirring and then stirring was continued for 6 minutes at a reaction mixture liquid temperature of 20 to 24° C. Then, 270 L of methylene chloride and 1.29 mol of triethylamine were added thereto and the polymerization was performed with stirring for about one hour. The temperature of a cooling medium passed through the jacket in this reaction was −25° C. The following treatment, analysis and evaluation method was performed in the same manner as in Example 1. The results were shown in Table 2.

EXAMPLE 5

1020 L of 8.8% (w/v) sodium hydroxide, 210 kg of 2,2-bis(4 hydroxyphenyl) propane of melt Hasen color number 45 after 4 hours from melting and 600 g of hydrosulfite were added to a glass lining reactor of 3,000 L, equipped with a stirrer, a phosgene gas injection nozzle, a condenser for organic solvent (hastelloy C heat exchanger), a pipe for returning an exhaust gas to the reactor through a check valve at the upper portion of the condenser and a jacket and stirring was performed. At this time, pH of a mixture thus obtained was 12.0. 300 L of methylene chloride was added thereto and 99 kg of phosgene was injected therein over 30 minutes with stirring. After 6 minutes from the completion of injection of phosgene, when the temperature of the reaction mixture liquid reached to 30° C., the closed system was opened and 100 ml of the reaction liquid was sampled. The measurement results of weight average molecular weight of polycarbonate oligomer in the reaction liquid and content of low molecular weight compounds and phosgene decomposition percentage, pressure inside the reactor and quantity of electricity for cooling necessary to produce 1 kg of polycarbonate oligomer were shown in Table 1. Further, pH of the aqueous phase of the reaction liquid was 11.6.

Then, 8.1 kg of p-t-butyl phenol, 30 L of methylene chloride and 150 L of 8.8% (w/v) sodium hydroxide were added thereto with stirring and then stirring was continued for 6 minutes. Then, 270 L of methylene chloride and 1.29 mol of triethylamine were added thereto and the polymerization was performed with stirring for about one hour. Cooling water of 20° C. was passed through the condenser and the jacket in this reaction. The following treatment, analysis and evaluation method were performed in the same manner as in Example 1. The results were shown in Table 2.

INDUSTRIAL APPLICABILITY

In the process for producing an aromatic polycarbonate oligomer in the present invention, it becomes possible to utilize latent heat of a solvent without causing loss of the solvent to be used as a process for re moving reaction heat, whereby production cost, running cost and productivity can be remarkably improved. Further, an aromatic polycarbonate resin can be produced without exerting any influence on hydrolysis of phosgene and color of polycarbonate.

TABLE 1

| Example & Comp. Ex. | Reaction temperature maximum value (° C.) | phsosgene decomposition percentage (%) | Weight average molecular weight (Mw) | Content of low molecular weight compounds (%) | Quantity of electricity (KWH/kg) | Pressure (absolute) (kPa) |
|---|---|---|---|---|---|---|
| Example 1 | 43.8 | 9.2 | 3000 | 2 | 0.002 | 137 |
| Example 2 | 44 | 8.8 | 3000 | 2.1 | 0.002 | 137 |
| Example 3 | 45.9 | 9.5 | 3000 | 2 | 0.002 | 140 |
| Example 4 | 43.9 | 9.3 | 3000 | 2 | 0.002 | 137 |
| Example 5 | 45.9 | 10.5 | 2900 | 2.2 | 0.002 | 140 |
| Comp. Ex. 1 | 44 | 9.3 | 3000 | 2.2 | 0.002 | 101 |
| Comp. Ex. 2 | 20.4 | 9.5 | 3100 | 2 | 0.2 | 101 |
| Comp. Ex. 3 | 20.4 | 9.2 | 3100 | 1.9 | 0.2 | 101 |

TABLE 2

| Example & Comp. Ex. | Viscosity average molecular weight (Mv) | Molecular weight distribution (Mw/Mn) | Resin end group | | Content of low molecular weight compounds (%) | Plate color (YI) | Loss of methylene chloride (%) |
|---|---|---|---|---|---|---|---|
| | | | OH group (ppm) | Cl group (ppm) | | | |
| Example 1 | 15,500 | 2.55 | 90 | 0.04 | 1.72 | 1.8 | 1.2 |
| Example 2 | 15,400 | 2.57 | 95 | 0.05 | 1.60 | 1.4 | 1.5 |
| Example 3 | 15,400 | 2.55 | 95 | 0.05 | 1.68 | 1.2 | 1.1 |
| Example 4 | 15,500 | 2.55 | 90 | 0.05 | 1.70 | 1.9 | 1.3 |
| Example 5 | 15,500 | 2.60 | 95 | 0.05 | 1.75 | 2.5 | 1.4 |
| Comp. Ex. 1 | 15,500 | 2.55 | 85 | 0.05 | 1.70 | 2.1 | 15.3 |
| Comp. Ex. 2 | 15,500 | 2.54 | 95 | 0.05 | 1.66 | 1.8 | 1.2 |
| Comp. Ex. 3 | 15,400 | 2.54 | 100 | 0.04 | 1.62 | 1.4 | 1.3 |

The invention claimed is:

1. A process for producing an aromatic polycarbonate oligomer which comprises:
   (a) charging an alkali aqueous solution of a bisphenol compound and a liquid organic solvent to a vessel shape reactor, equipped with a phosgene gas injection nozzle, a reflux condenser for organic solvent, a pipe positioned on an upper portion of said reflux condenser for returning an exhaust gas to said reactor, a stirrer and a cooling jacket
   (b) then, forming a liquid mixture with stirring
   (c) then, injecting phosgene into said liquid mixture through said phosgene gas injection nozzle with stirring to react said bisphenol compound with phosgene,
   (d) removing reaction heat generated during the reaction by cooling, utilizing vaporization latent heat of said liquid organic solvent
   (e) condensing vaporized organic solvent with said reflux condenser to return to said reactor and returning an exhaust gas comprising non-condensed organic solvent vapor to said reactor via said pipe for returning to said reactor
   (f) thereby, obtaining a reaction liquid comprising an aromatic polycarbonate oligomer, and
   (g) passing water through said cooling jacket to cool said reaction liquid comprising an aromatic polycarbonate oligomer.

2. The process according to claim 1, wherein said bisphenol compound is 2,2-bis(4-hydroxyphenyl) propane.

3. The process according to claim 1, wherein said organic solvent is methylene chloride.

4. The process according to claim 1, wherein said pipe for returning an exhaust gas to said reactor is equipped with a check valve and/or a gas circulating pump.

5. The process according to claim 1, controlling pH of said alkali aqueous solution of a bisphenol compound so as to be maintained to the range of 10 to 12 in the injection of phosgene.

6. The process according to claim 1, wherein the reaction from after charging said alkali aqueous solution of a bisphenol compound and said liquid organic solvent to the completion of injection of phosgene gas is performed in a closed system.

7. The process according to claim 1, wherein the reaction temperature is 30 to 500° C.

8. The process according to claim 1, wherein a carbon tetrachloride content in phosgene is 100 ppm or below.

9. The process according to claim 1, wherein said reaction liquid comprising an aromatic polycarbonate oligomer is cooled to a temperature lower by 5° C.: or more than a boiling point of the organic solvent.

10. A process for producing an aromatic polycarbonate resin which comprises:
   (a) charging an alkali aqueous solution of a bisphenol compound and a liquid organic solvent to a vessel shape reactor, equipped with a phosgene gas injection nozzle, a reflux condenser for organic solvent, a pipe positioned on an upper portion of said reflux condenser for returning an exhaust gas to said reactor, a stirrer and a cooling jacket
   (b) then, forming a liquid mixture with stirring
   (c) then, injecting phosgene into said liquid mixture through said phosgene gas injection nozzle with stirring to react said bisphenol compound with phosgene,
   (d) removing reaction heat generated during the reaction by cooling, utilizing vaporization latent heat of said liquid organic solvent
   (e) condensing vaporized organic solvent with said reflux condenser to return to said reactor and returning an exhaust gas comprising non-condensed organic solvent vapor to said reactor via said pipe for returning to said reactor
   (f) thereby, obtaining a reaction liquid comprising an aromatic polycarbonate oligomer
   (g) then, passing water through said cooling jacket to cool said reaction liquid comprising an aromatic polycarbonate oligomer
   (h) then, adding further liquid organic solvent, an alkali aqueous solution, a molecular weight modifier and a polymerization catalyst to said cooled reaction liquid comprising an aromatic polycarbonate oligomer in said vessel shape reactor or transferring said cooled reaction liquid comprising an aromatic polycarbonate oligomer into another vessel shape reactor equipped with a reflux condenser for organic solvent, a stirrer and a cooling jacket different from said vessel type reactor and then adding further liquid organic solvent, an alkali aqueous solution, a molecular weight modifier and a polymerization catalyst thereto,
   (i) performing stirring to continue polycondesation reaction while passing water through both the reflux condenser for organic solvent and the cooling jacket, and
   (j) thereby, obtaining an aromatic polycarbonate resin according to an interfacial polymerization method.

11. The process according to claim 10, wherein said polymerization catalyst is triethylamine.

12. The process according to claim 10, wherein an amount of 0.1 to 10 mmol of triethylamine per 1 mol of charged bisphenol compound is added as said polymerization catalyst.

13. The process according to claim 10, wherein said organic solvent is methylene chloride.

14. The process according to claim 10, wherein said bisphenol compound is 2,2- bis(4hydroxyphenyl) propane.

15. The process according to claim 10, wherein said pipe for returning an exhaust gas to said reactor is equipped with a check valve and/or a gas circulating pump.

16. The process according to claim 10, controlling pH of said alkali aqueous solution of a bisphenol compound so as to be maintained to the range of 10 to 12 in the injection of phosgene.

17. The process according to claim 10, wherein the reaction from after charging said alkali aqueous solution of a bisphenol compound and said liquid organic solvent to the completion of injection of phosgene gas is performed in a closed system.

18. The process according to claim 10, wherein the reaction temperature in the reaction of said bisphenol and phosgene is 30 to 500° C.

19. The process according to claim 10, wherein a carbon tetrachioride content in phosgene is 100 ppm or below.

20. The process according to claim 10, wherein said reaction liquid comprising an aromatic polycarbonate oligomer is cooled to a temperature lower by 5° C. or more than a boiling point of the organic solvent.

* * * * *